(12) United States Patent
Lindsay et al.

(10) Patent No.: US 7,784,726 B2
(45) Date of Patent: Aug. 31, 2010

(54) MULTI-SPOOL SEATBELT RETRACTOR

(75) Inventors: Derek Lindsay, Marysville, OH (US);
Kenneth Pilcher, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 11/649,066

(22) Filed: Dec. 31, 2006

(65) Prior Publication Data
US 2008/0156921 A1    Jul. 3, 2008

(51) Int. Cl.
*B65H 75/48*    (2006.01)
(52) U.S. Cl. .................................... 242/376; 242/407
(58) Field of Classification Search ............. 242/376,
242/371, 378.4, 407, 376.1, 388.9, 570, 588,
242/590, 613, 613.1, 613.2, 600, 610, 610.2,
242/610.4, 129, 899; 280/807; 297/475,
297/476, 477, 478
See application file for complete search history.

(56) References Cited
U.S. PATENT DOCUMENTS

| | | | |
|---|---|---|---|
| 4,135,683 A | 1/1979 | Stephenson et al. | |
| 4,343,445 A | 8/1982 | Ocker et al. | |
| 4,427,163 A | 1/1984 | Kondziola | |
| 4,482,101 A * | 11/1984 | Bart, Jr. | 242/376 |
| 4,896,844 A | 1/1990 | Gavagan et al. | |
| 4,919,450 A * | 4/1990 | Doty et al. | 280/803 |
| 6,712,305 B2 | 3/2004 | Palliser et al. | |
| 6,793,249 B2 | 9/2004 | Löbert et al. | |
| 7,364,200 B2 * | 4/2008 | Downey | 280/801.1 |
| 7,401,815 B2 * | 7/2008 | Clute | 280/803 |
| 2002/0047256 A1 | 4/2002 | Kopetzky | |
| 2002/0067035 A1 | 6/2002 | Ritters et al. | |
| 2006/0208124 A1 | 9/2006 | Clute | |

FOREIGN PATENT DOCUMENTS
DE    3737364 A1 *    5/1989

* cited by examiner

*Primary Examiner*—John Q Nguyen
*Assistant Examiner*—Juan J Campos
(74) *Attorney, Agent, or Firm*—Mark E. Duell, ESQ.; Emerson Thomson Bennett

(57) ABSTRACT

A seatbelt retractor for storing seatbelt webbing that can be utilized to restrain an occupant of a motor vehicle. The retractor includes a retractor frame and a plurality of spools rotatably coupled to the retractor frame and spaced a distance apart from each other. Seatbelt webbing can be withdrawn from the seatbelt retractor to extend about an occupant of a seat of the motor vehicle and releasably coupled to a buckle provided to the motor vehicle in a withdrawn state, and collected by the seatbelt retractor in a retracted state. A length of the seatbelt webbing adjacent to a terminal end thereof is collected at least partially around the plurality of spools in the retracted state.

8 Claims, 5 Drawing Sheets

MULTI-SPOOL SEATBELT RETRACTOR

BACKGROUND OF THE INVENTION

1. Field of the Invention

The present invention is directed generally to a seatbelt retractor, and more specifically, to a seatbelt retractor including a plurality of spools for collecting retracted seatbelt webbing and storing said webbing.

2. Description of Related Art

Conventional seatbelt retractors have traditionally included a spool around which excess seatbelt webbing is wound as said excess webbing is retracted into the retractor. When an occupant of a motor vehicle releases and removes the seatbelt, the slack is taken up through operation of the seatbelt retractor, from where it can subsequently be withdrawn when needed again. Some seatbelt retractors have included an optional webbing guide in the form of a roller that is remotely located away from the collection spool for tensioning and directing the excess webbing in a direction toward the spool during retraction. Properly directing the excess webbing during retraction minimizes interference with the webbing that can result in improper retraction, but the webbing guide does not collect the seatbelt webbing when not retracted from the retractor. Instead, as the webbing is wound around the spool, the outside diameter of the spool and webbing becomes quite large, thereby requiring significant storage space within the retractor to accommodate all of the excess seatbelt webbing.

Collecting and storing enough seatbelt webbing for large occupants of motor vehicles just worsens the spatial requirements for housing the spool and all the required seatbelt webbing to restrain those large occupants within the motor vehicle. Large occupants require lengthy expanses of seatbelt webbing to extend about the occupant to location where a latch can be inserted into a compatible fastener securing the latch within the fastener safely secures the occupant within the vehicle seat. The lengthy expanse of seatbelt webbing required to extend about a large occupant makes the diameter of the webbing wound about the spool even larger than it would be for a length of seatbelt webbing for restraining a smaller occupant of the motor vehicle. This, in turn, requires an even larger storage space in which the spool and its collected webbing can be disposed.

Previous attempts to store long expanses of seatbelt webbing have typically revolved around the use of large-diameter spools about which the webbing is wound to be collected when not in use. Increasing the diameter of the spool provides a larger surface area about which collected seatbelt webbing can be wound and stored. As noted above, however, the large-diameter spools require large storage areas in which to be stored to accommodate both the spool and the excess seatbelt webbing wound there around.

Traditionally, the cylindrical spools around which the webbing is collected and stored have been housed within an internal compartment formed in a side panel of the motor vehicle. These side panels extend into the interior of the vehicle's cabin to an extent that permits formation of an internal compartment that is suitably-sized to receive the spool and its entire complement of seatbelt webbing. Large-diameter spools with significant amounts of webbing requires large internal compartments within a side panel of the motor vehicle, thereby minimizing room within the cabin for occupants and other articles to be stored within the vehicle. Thus, the amount of excess seatbelt webbing that can be wound around such a large diameter of spool is limited by the internal storage cavity in which the retractor spool is located.

Further, conventional seatbelt retractors have utilized different sized spools to collect and store different lengths of seatbelt webbing depending upon the model of vehicle in which the retractor is to be installed. The outside diameter of the spool has traditionally been maximized to fit within the dimensions of the storage cavity of the retractor for the specific vehicle in which it is to be installed. Thus, such an arrangement required automotive manufacturers to warehouse and install many spools having different outside diameters to accommodate the length of stored seatbelt webbing desired for each particular model of vehicle produced. Vehicles which are to be provided with longer seatbelt webbings have heretofore required larger diameter spools than vehicles to be provided with shorter lengths of seatbelt webbing.

Accordingly, there is a need in the art for a seatbelt retractor than can store lengthy expanses of seatbelt webbing that can be withdrawn from the tractor to extend at least partially around a large occupant of a motor vehicle. The seatbelt retractor can optionally be adjustable to accommodate a plurality of different lengths of seatbelt webbing without requiring spools having different outside diameters.

BRIEF SUMMARY OF THE INVENTION

According to one aspect, the present invention provides a seatbelt retractor for storing seatbelt webbing that can be utilized to restrain an occupant of a motor vehicle. The retractor includes a retractor frame and a plurality of spools rotatably coupled to the retractor frame and spaced a distance apart from each other. Seatbelt webbing can be withdrawn from the seatbelt retractor to extend about an occupant of a seat of the motor vehicle and releasably coupled to a buckle provided to the motor vehicle in a withdrawn state, and collected by the seatbelt retractor in a retracted state. A length of the seatbelt webbing adjacent to a terminal end thereof is collected at least partially around the plurality of spools in the retracted state.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein.

DETAILED DESCRIPTION OF ILLUSTRATIVE EMBODIMENTS

Figure 1:
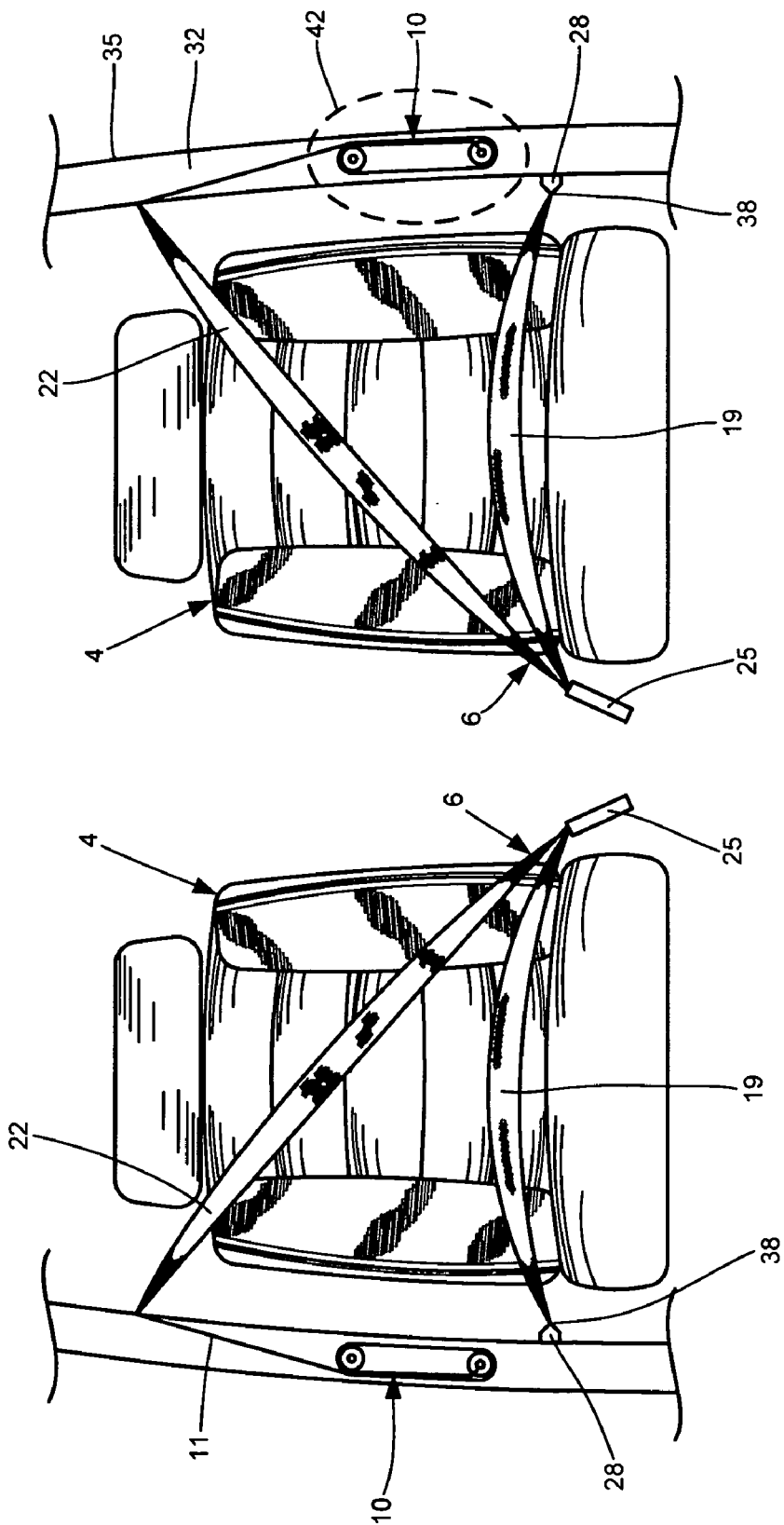
FIG. 1 is a front view of two front seats of a motor vehicle with seatbelt webbing withdrawn from a seatbelt retractor and releasably coupled to a buckle secured to the motor vehicle.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

FIG. 1 shows a front view looking into two front seats 4 of a motor vehicle, with a side panel 35 of the motor vehicle cutaway to reveal an interior cavity 32 in which a seatbelt retractor 10 of the present invention can optionally be disposed. The present invention is not limited to a seatbelt retractor 10 for securing occupants within a front seat 4 of a motor vehicle, but can also be implemented in a known manner to secure the occupants of a rear seat (not shown) or a plurality of rear seats disposed behind the front seats 4. As shown in FIG. 1, the front seats 4 are positioned adjacent to each other but can be adjusted in the fore and aft directions within the motor vehicle as desired by the occupant of each seat 4. The view of the front seats 4 shown in FIG. 1 is from a perspective of a front dashboard (not shown) provided to the motor vehicle wherein the dashboard has been removed to provide a clear view of the interior cabin of the motor vehicle.

Figure 2:
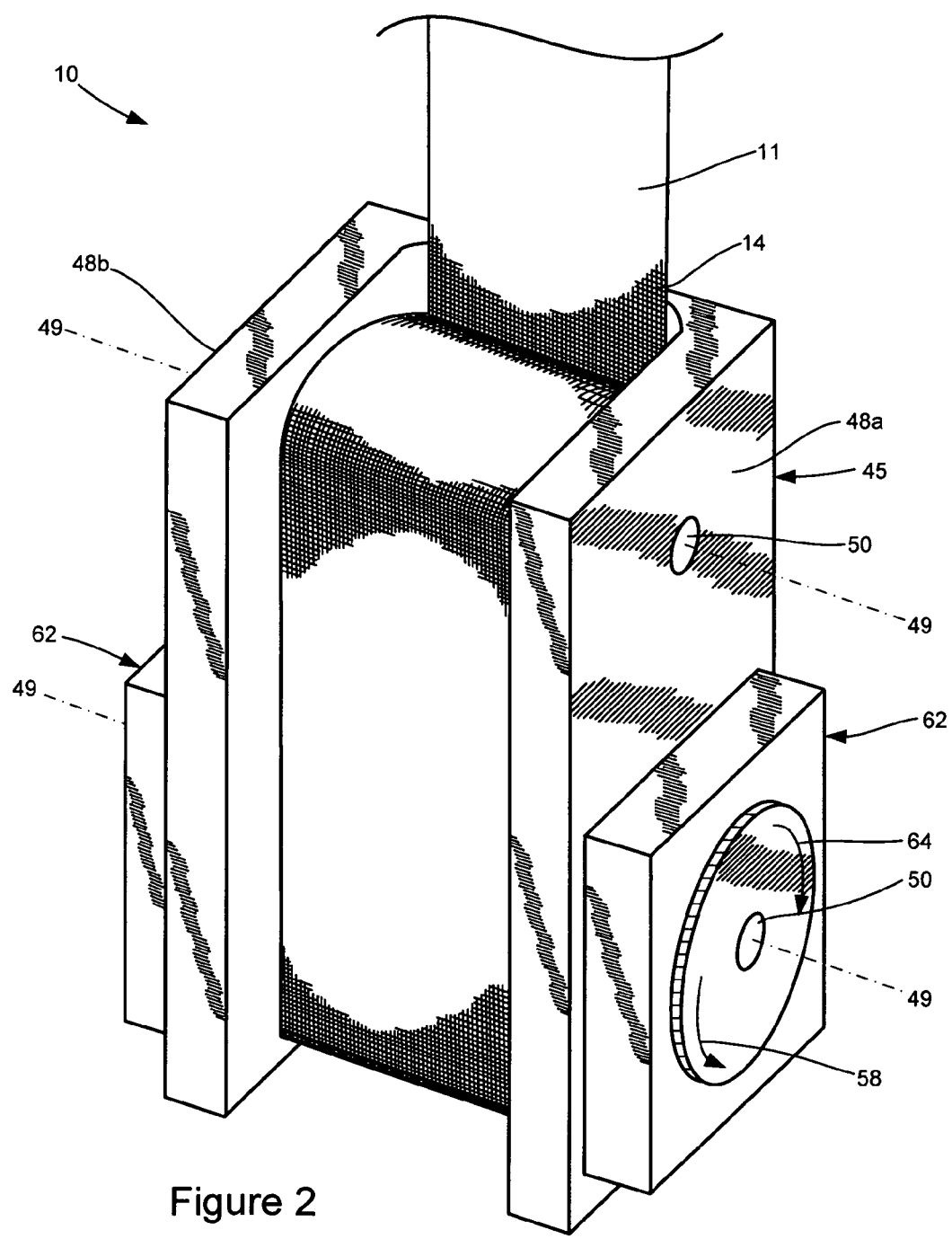
FIG. 2 is a perspective view of a multi-spool seatbelt retractor assembly in accordance with an embodiment of the present invention.

The motor vehicle is equipped with a seatbelt system 6 that is provided to secure the occupant of each seat 4 therein in the event of a collision between the motor vehicle and an external object. The seatbelt system 6 includes seatbelt webbing 11 that can be extended about an upper torso and a lap of the occupant of each seat 4. The seatbelt webbing 11 can be fabricated from any suitable fabric strong enough to withstand the forces imparted by the occupant of the motor vehicle in the event of a collision between the motor vehicle and an external object. The fabrics of the seatbelt webbing 11 can include any synthetic fabric, naturally occurring fabric, or a combination thereof, and can optionally be a woven or non-woven fabric as appropriate to maximize the resistance of the webbing 11 to ripping when restraining an occupant of the motor vehicle. For example, the fabric can be woven into a cross-hatch pattern 14 as shown in FIG. 2.

Depending upon the particular arrangement of the seatbelt system 6 and the seat 4 to which the seatbelt system 6 is provided, the seatbelt system 6 can optionally include only a lap-restraining portion 19, or a combination of a lap-restraining portion 19 and an upper-torso restraining portion 22. For the sake of clarity, however, the seatbelt system 6, and namely the seatbelt retractor 10 of the present invention will be described primarily with reference to a front seat 4 of an automobile, wherein the seatbelt system 6 includes a combination of a lap-restraining portion 19 and an upper-torso restraining portion 22 as shown in FIG. 1.

The seatbelt assembly 6 in FIG. 1 can be releasably secured about the seat 4 in which the occupant is to be seated by coupling the seatbelt assembly 6 to a releasable buckle 25 that is secured to the motor vehicle. According to such an arrangement, the seatbelt assembly 6 includes a single, continuous seatbelt webbing 11 that forms both the lap and upper-torso restraining portions 19, 22. A terminal end 38 of the seatbelt webbing 11 forming the lap-restraining portion 19 is secured to the motor vehicle by an anchor 28, which, in FIG. 1 is secured to the side panel 35. The seatbelt webbing 11 of the lap-restraining portion 19 extends a distance to a clip (not shown) that cooperates with the buckle 25, where it is folded over and continuous on to establish the upper-torso restraining portion 22. The clip of the seatbelt assembly 6 is slidable along the seatbelt webbing 11 to adjust the length of the lap-restraining portion 19 to accommodate occupants of various sizes when the seatbelt assembly 6 is secured to the buckle 25.

An amount of seatbelt webbing 11 can be extended from the seatbelt retractor 10 once the lap-restraining portion 19 has been sized to establish a suitable length of the upper-torso restraining portion 22 to extend about the upper torso of the occupant within the seat 4 while the seatbelt assembly 6 is secured to the buckle 25. The suitable amount of seatbelt webbing 11 can be manually withdrawn from a seatbelt retractor 10 by the occupant in a known manner to adjust the size of the seatbelt assembly 6 to safely restrain the occupant in the seat 4 without applying such a force as to subject the occupant to significant discomfort. For the embodiment shown in FIG. 1, the amount of seatbelt webbing 11 can be withdrawn from an interior cavity 32 formed in a side panel 35 of the motor vehicle. Examples of the side panel 35 include a load-bearing beam, an aesthetic panel in the interior cabin of the motor vehicle, an entry door of the motor vehicle, and the like.

The supply of seatbelt webbing 11 that can be withdrawn by the occupant to establish a suitable size of the seatbelt assembly 6 is collected and stored by a seatbelt retractor 10 disposed within the cavity 32. Thus, one terminal end 38 of the seatbelt assembly 6 is secured to the motor vehicle by the anchor 28 while the other terminal end can be removably retracted by the seatbelt retractor 10 disposed within the cavity 32 of the motor vehicle. However, the present invention also includes a seatbelt assembly 6 having a lap-restraining portion 19 and a upper-torso restraining portion 22 formed as separate and distinct lengths of seatbelt webbing 11. Further, the seatbelt assembly 6 can optionally include a first terminal end 38 that is also retractable into a second seatbelt retractor secured to the motor vehicle instead of being secured to the anchor 28 as shown in FIG. 1. Such an arrangement allows both terminal ends of the webbing 11 to be selectively withdrawn from, and subsequently retracted by a seat belt retractor. For such embodiments, both the lap-restraining portion 19 and the upper-torso restraining portion 22 can be secured to the clip that is to be removably coupled to the buckle 25 for securing the seatbelt assembly 6 about an occupant of the motor vehicle. But again, for clarity, the present invention will be described below with reference primarily to the embodiment shown in FIG. 1 wherein only one terminal end of the seatbelt assembly 6 is coupled to the seatbelt retractor 10 to allow excess webbing 11 to be removably collected and stored by a seatbelt retractor 10 according to the present invention.

The seatbelt retractor 10 of the present invention is shown in the partial cutaway view of FIG. 1 as being enclosed by the broken line 42. The seatbelt retractor 10 can optionally be stored within a modular housing 45, shown best in FIG. 2, allowing for easy installation on a motor vehicle during assembly. The housing 45 includes two laterally spaced sidewalls 48a, 48b between which a plurality of spool axles 50 can extend. Each spool axle 50 is an elongated and generally-cylindrical metallic or other suitably-rigid member that can rotatably support a spool 54 (FIGS. 3-6). Rotation of the spools 54 about its respective spool axle 50 causes retraction of, and allows for the withdrawal of seatbelt webbing 11 adjacent to the terminal end of the seatbelt webbing 11 that is not secured to the anchor 28. Each spool axle 50 is independently selected to be rotatable about a central axis 49 within the housing 45 of the seatbelt retractor 10, or to allow rotation of its respective spool 54 about the central axis 49 as required to retract the seatbelt webbing 11 and to allow the seatbelt webbing 11 to be removed from the retractor 10 by the occupant as described in detail below.

At least one of the plurality of spools 54 about which seatbelt webbing 11 is to be wound and collected when not withdrawn to allow the seatbelt assembly 6 to extend about, and properly secure the occupant within the seat 4 can be biased to rotate in a predetermined angular direction in which the spool is to be rotated to retract the seatbelt webbing 11. Thus, for the orientation shown in FIG. 2, the lowermost spool 54 is biased to rotate in a clockwise direction, indicated by arrow 64, about the central axis 49. When the lowermost spool 54 is so rotated in the clockwise direction 64, the seatbelt webbing 11, is retracted from the interior cabin of the motor vehicle and collected about the plurality of spools 54 by the retractor 10. Rotation of one or more of the spools 54 in a direction causing retraction of the seatbelt webbing will be referred to herein as a retracting direction 64.

Biasing at least one of the plurality of spools 54 can be accomplished according to the present invention in any conventional manner. For example, the seatbelt retractor shown in FIG. 2 includes a spool biasing assembly 62 that includes a helical spring wound about the spool axle 50 of the lowermost spool 54. With the non-used seatbelt webbing 11 fully retracted, such as when the seatbelt assembly 6 is removed from the releasable buckle 25, the helical spring imparts a biasing force on the lowermost spool 54, thereby maintaining the seatbelt webbing 11 in the retracted position. Due to the biasing force imparted on the lowermost spool 54, the webbing 11 is not allowed to be withdrawn freely from the retractor 10 due merely to the weight of the webbing 11 itself.

As the seatbelt webbing 11 is withdrawn from the retractor 10 by the occupant of the respective seat 4, the plurality of spools 54 are caused to rotate in an angular direction opposite to their rotation during retraction of the webbing 11. Rotation of the spools 54 is caused by frictional forces imparted on the spools 54 as the webbing 11 is drawn there over. As the lowermost spool 54 is rotated in this counter clockwise direction as shown in FIG. 2 and indicted by arrow 58, the biasing force imparted by the helical spring within the spool biasing assembly 63 becomes greater than it was with the seatbelt webbing 11 fully retracted. Accordingly, when the occupant of the seat 4 desires to remove the seatbelt assembly 6, the excess seatbelt webbing 11 is caused to be retracted by the retractor 10, and in particular, by the spool biasing assembly 62.

The seatbelt retractor 10 can optionally include a spool biasing assembly 62 provided adjacent to each lateral side of the lowermost spool 54 as shown in FIG. 2, but the retractor 10 can also optionally include a single spool biasing assembly 62 provided adjacent to only one lateral side of the lowermost spool 54. And although the spool biasing assembly 62 is shown in FIG. 2 adjacent to each terminal end of the lowermost spool 54 and coupled externally of each sidewall 48A, 48B of the housing 45, other embodiments of the present invention include a spool biasing assembly 62 provided anywhere on the retractor 10 to impart a biasing force biasing at least one spool 54 in an angular direction in which the spool 54 is rotated when the seatbelt webbing 11 is retracted. Examples include providing a spool biasing assembly 62, inside of, and radially inward of an external surface of one of the spools 54. Such embodiments can optionally minimize the number of components provided externally of the housing 45 of the retractor 10.

Further, the spool biasing assembly 62 can optionally be provided to the upper most spool 54, which is positioned above, and closer to a location where the webbing 11 is withdrawn from the plurality of spools 54 than the lowermost spool 54 shown in the figures. Yet alternate embodiments include a retractor 10 comprising one or more spring biasing assemblies 62 provided to more than one of the plurality of spools 54 about which excess seatbelt webbing 11 can be retracted and collected by the retractor 10.

Figure 7:
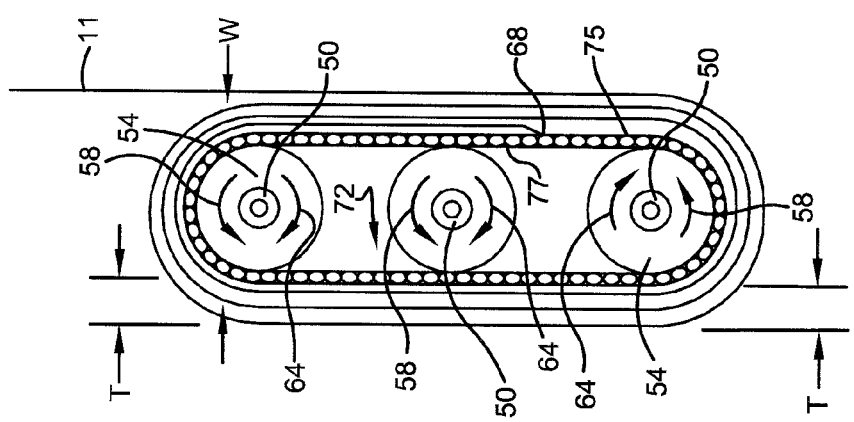
FIG. 7 is a side view of a plurality of spools supporting a track for collecting and storing seatbelt webbing with a seatbelt retractor assembly in accordance with an embodiment of the present invention, wherein the plurality of spools includes three spools.

Further, the embodiments of the present invention can optionally include a retractor 10 with more than two spools 54, as shown in FIG. 7, in which case at least one or more of the spools 54 can, in addition to the upper most, lower most, or both the upper most and lower most spools 54, be provided with a spool biasing assembly 62. For example, the retractor 10 can optionally include three spools 54 arranged in a substantially linear pattern, in which case, the spool 54 disposed between the uppermost and lowermost spools 54 can optionally be provided with the spool biasing assembly 62.

Figure 4:
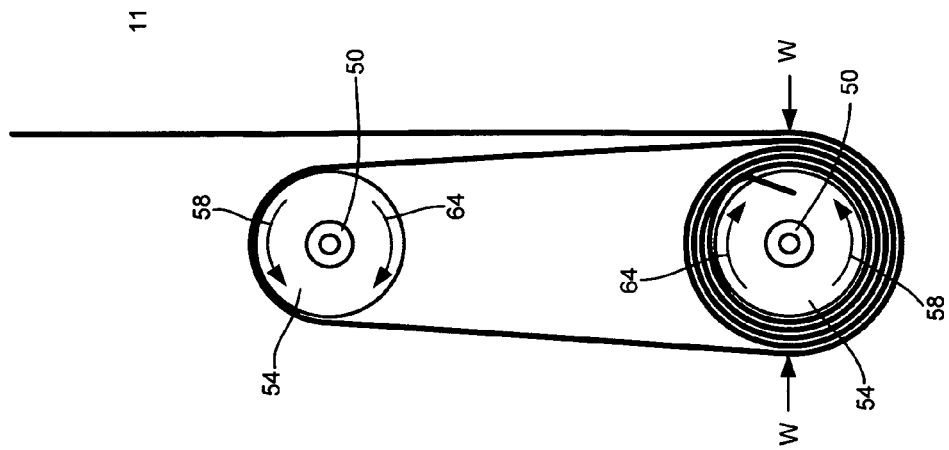
FIG. 4 is a side view of a plurality of spools for collecting and storing seatbelt webbing with a seatbelt retractor assembly in accordance with an embodiment of the present invention, wherein the seatbelt webbing is in a retracted state to be stored such as when the seatbelt webbing is not coupled to a buckle secured to a motor vehicle.
Figure 3:
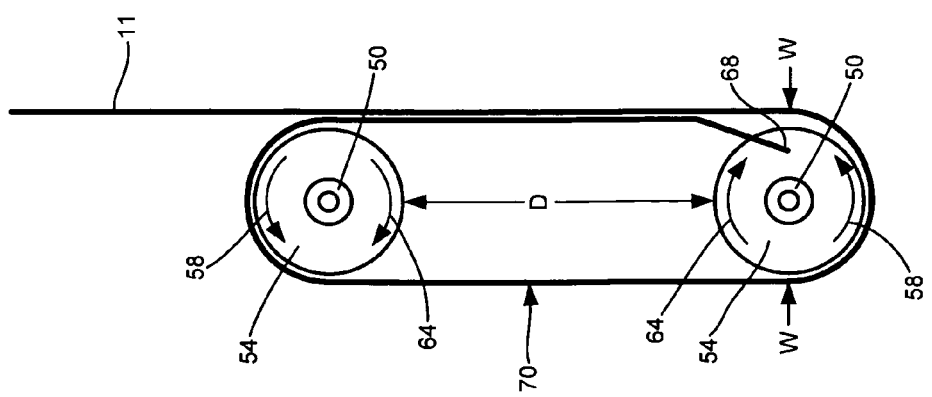
FIG. 3 is a side view of a plurality of spools for collecting and storing seatbelt webbing with a seatbelt retractor assembly in accordance with an embodiment of the present invention, wherein the seatbelt webbing is in a withdrawn state such as when the seatbelt assembly is removably coupled to a buckle secured to a motor vehicle.

FIGS. 3 and 4 show the relative positioning of the uppermost and lowermost spools 54 of an embodiment of the retractor 10 including two spools 54, wherein the housing 45 has been cutaway for clarity. The housing 45 of the retractor 10 can optionally be integrally formed as part of the sidewall 35 of the motor vehicle, in which case the spool axles 50 can extend between two internal surfaces of the sidewall 35. But regardless of the formation of the housing 45, the plurality of spools 54 can be spaced from each other by a distance D to accommodate a desired length of seatbelt webbing 11 when fully retracted into the retractor 10. The greater the distance D between the two spools 54, the greater the maximum length of webbing 11 that can be collected around those two spools 54 without increasing the overall diameter W of each spool 54 and the collected webbing 11. Thus, the spools 54 should be spaced the greatest possible distance D apart from each other to maximize the length of the webbing 11 that can be collected by the retractor 10 within the internal cavity 32 of the motor vehicle's side panel 35.

In FIG. 3, the seatbelt webbing 11 has been withdrawn from the retractor 10 to permit the occupant to extend the seatbelt assembly 6 across the seat 4 in which the occupant is seated to be secured to the buckle 25. As such, much of the seatbelt webbing 11 is no longer wound about the plurality of spools 54 but instead is extended into the cabin of the motor vehicle. As the seatbelt webbing 11 is withdrawn from the retractor 10, the spools 54 are rotated in the withdrawing direction indicated in FIGS. 3 and 4 by the arrows 58. Likewise, each spool 54 can be rotated in a retracting direction indicated by the arrows 64. The terminal end 68 of the seatbelt webbing 11 is secured to one of the spools 54 to prevent the occupant from completely removing the seatbelt webbing 11 from the retractor 10 thereby separating the seatbelt assembly 6 from the retractor 10. In FIG. 3, the maximum length of seatbelt webbing 11 has been withdrawn from the retractor 10 without causing separation of the terminal end 68 of the webbing 11 from the lowermost spool 54. The lowermost spool 54 can no longer rotate in the withdrawing direction 58 to let out any additional length of seatbelt webbing 11. This corresponds to a fully withdrawn state of the seatbelt webbing 11 from the retractor 10. It is in this state that the diameter W of the spool 54 and webbing 11 around the lowermost spool 54 to which the terminal end 68 of the webbing 11 is secured is minimized.

In contrast, FIG. 4 illustrates an exemplary arrangement of the plurality of spools 54 with the seatbelt webbing 11 fully retracted and collected by the retractor 10. The fully retracted state of the seatbelt webbing 11 corresponds to the removal of the seatbelt assembly 6 from the buckle 25 and returning the seatbelt assembly 6 to its unused position. The seatbelt webbing 11 extends around, and is collected for storage about the lowermost spool 54 in FIG. 4 as well as the uppermost spool 54, before eventually collecting around the lowermost spool 54 to which the terminal end 68 of the webbing 11 is secured. Being secured at its terminal end 68 to the lower most spool 54, the seatbelt webbing 11 is collected by the retractor 10, causing the webbing 11 to be wound about at least a portion of both spools 54 before being wrapped entirely around the lowermost spool 54. With the seatbelt webbing 11 retracted in this manner, the portion of the webbing 11 extending between the upper most and lower most spools 54 is not wound solely about the lower most spool 54 thereby minimizing the diameter W of the lowermost spool 54 in combination with the webbing 11 collected around the lowermost spool 54. The greater the distance D between the spools 54, the lesser the diameter W of the lower most spool 54 in combination with the seatbelt webbing 11 wound there around will be. Minimizing the diameter W of the spool 54 to which the terminal end 68 of the webbing is secured in combination with the webbing 11 itself allows for minimizing the dimensions of the interior cavity 32 of the sidewall of the motor vehicle in which the seatbelt retractor 10 can be installed. Further, a suitable length of seatbelt webbing 11 can still be supported by such a retractor 10 to properly secure large occupants of the motor vehicle in their respective seats 4 without requiring large diameter spools 54. Thus, even when the seatbelt webbing 11 is in the fully-retracted state, the diameter W of the lower most spool 54 in combination with the seatbelt webbing 11 wound there around is minimized since the portion of the webbing 11 extending between the spools 54 is not wound about the lower most spool 54.

References herein to collecting, or spooling the webbing 11 at least partially around the plurality of spools 54 means that the webbing 11 adjacent to the terminal end 68 that is coupled to the retractor 10, or a portion thereof, forms a loop 70 about the plurality of spools 54, as a group. The loop 70 is substantially continuous because the webbing 11 being collected during retraction does not necessarily have to form a perfectly closed loop. Instead, according to the embodiments shown in FIGS. 3 and 4, the terminal end 68 of the webbing 11 can optionally be secured to one of the spools 54, which in the embodiment shown in FIGS. 3 and 4, is the lowermost spool 54. As that spool 54 to which the terminal end 68 is secured rotates, it draws the webbing 11 being collected over the other spool 54 (the uppermost spool 54 in FIGS. 3 and 4) before winding around the lowermost spool 54. As the lowermost spool 54 continues to rotate in the retracting direction 64, excess webbing 11 not extending between the two spools 54 but collected by the retractor 10 is wound around the lowermost spool 54. The combined diameter W of the lowermost spool 54 and the webbing 11 wound around that spool 54 is minimized since the length of webbing 11 extending between the two spools 54 is not collected entirely about the lowermost spool 54.

FIG. 3 shows the plurality of spools 54 with the seatbelt webbing 11 fully withdrawn from the retractor 10. The lowermost spool 54 to which terminal end 68 of the seatbelt webbing 11 is secured can no longer rotate in the withdrawing direction 58 to release any more seatbelt webbing 11 without causing the terminal end 68 of the webbing 11 to breaking free of the lowermost spool 54.

In contrast, FIG. 4 shows an embodiment wherein at least a portion of the seatbelt webbing 11 has been retracted, and thus collected about the plurality of spools 54 of the retractor 10. During retraction, the spool 54 to which the terminal end 68 of the webbing 11 is secured and that is biased by the spool biasing assembly 62 (lowermost spool 54 in FIG. 4) is allowed to rotate in the retracting direction 64 under the force imparted by the spool biasing assembly 62. Rotation of the lowermost spool 54 in FIG. 4 in that manner takes up the slack in the excess webbing 11, causing it to be collected about the plurality of spools 54, and if sufficiently retracted, eventually around the lowermost spool 54.

Figure 5:
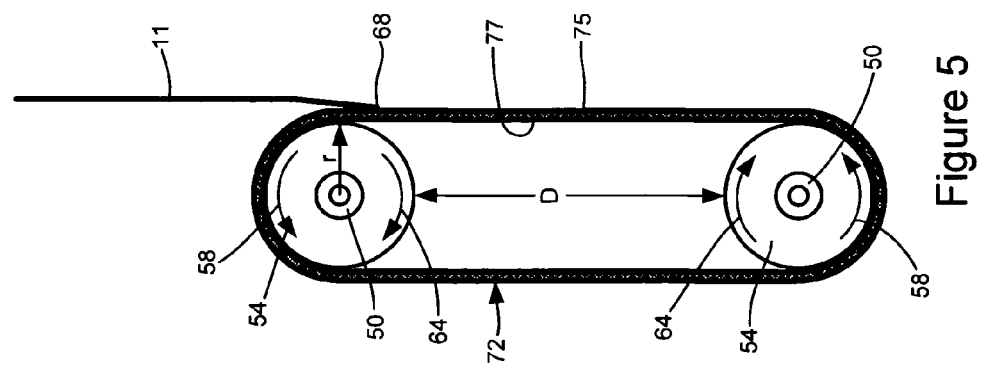
FIG. 5 is a side view of a plurality of spools supporting a track for collecting and storing seatbelt webbing with a seatbelt retractor assembly in accordance with an embodiment of the present invention, wherein the seatbelt webbing is in a withdrawn state such as when the seatbelt assembly is removably coupled to a buckle secured to a motor vehicle.

FIG. 5 shows an alternate embodiment of a seatbelt retractor 10 including a plurality of spools 54 about which a flexible track 72 extends. The track 72 can extend about both of the spools 54 shown in FIG. 5, and can be suitably sized to encompass any number of spools 54 desired for storing a length of seatbelt webbing 11 suitable for securing large occupants within the seat 4 of a motor vehicle. The track 72 can be formed from a rubberized or other flexible material such that it can be arcuately deformed as it rolls over each of the spools 54, yet be straightened while passing between the spools 54. Alternate embodiments of the present invention include a track 72 that is formed from a length of seatbelt webbing 11 wound about the plurality of spools 54, as a group, and secured to itself. Such an arrangement would create a closed, flat loop extending about the plurality of spools about which retracted seatbelt webbing 11 can be collected. Thus, when the one or more spools 54 biased by the spool biasing assembly 62 is allowed to rotate in the retracting direction 64, the track 72 can rotate in the flat loop about the spools 54, thereby winding the retracted seatbelt webbing 11 around the track 72.

Figure 6:
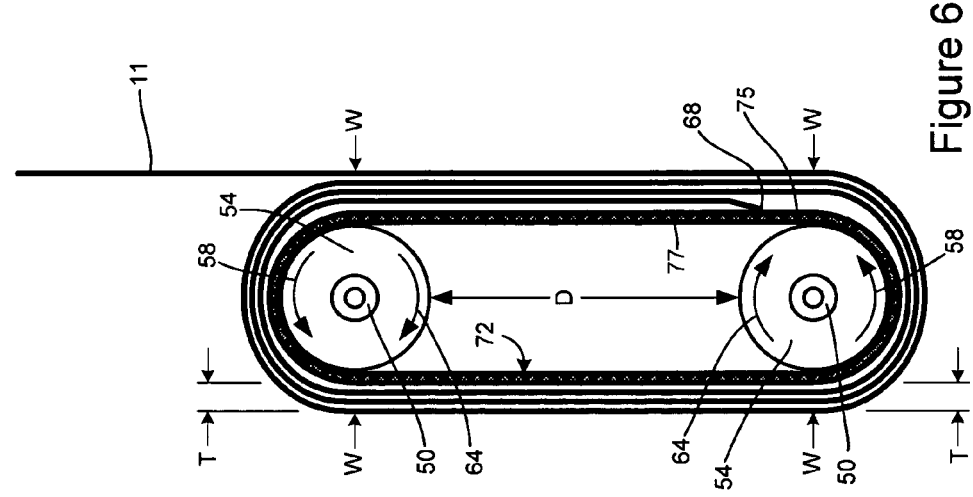
FIG. 6 is a side view of a plurality of spools supporting a track for collecting and storing seatbelt webbing with a seatbelt retractor assembly in accordance with an embodiment of the present invention, wherein the seatbelt webbing is in a retracted state to be stored such as when the seatbelt webbing is not coupled to a clip secured to a motor vehicle.

According to the embodiments shown in FIGS. 5 and 6, instead of being secured to one of the plurality of spools 54, the terminal end 68 of the seatbelt webbing 11 can be secured to an outwardly-exposed surface 75 of the track 72. The outwardly-exposed surface 75 of the track 72 is the surface of the track 72 that is the furthest distance in a radial direction r from the central axis 49 of the spool 54 while rotating over the spool 54. Thus, the outwardly-exposed surface 75 is a planar surface that is opposite the inward-facing surface 77 which contacts the spools 54 as the track 72 passes over said spools 54 while rotating.

As the seatbelt webbing 11 is retracted by the seatbelt retractor 10 according to the embodiments in FIGS. 5 and 6, the seatbelt webbing 11 is wound substantially uniformly about all of the plurality of spools 54 as a group, as shown in FIG. 6. When the seatbelt webbing 11 is in the fully retracted state, the diameter W of each spool 54 and the seatbelt webbing 11 wound at least partially there around is approximately the same. Minor differences in the total diameter of each spool and webbing 11 can optionally be experienced when the terminal end 68 has passed over one spool 54 more often than the terminal end 68 has passed over the other spool(s) 54. But even considering such minor differences, the total diameter W of the spools 54 and the collected webbing 11 are considered to be approximately the same.

Figure 8:
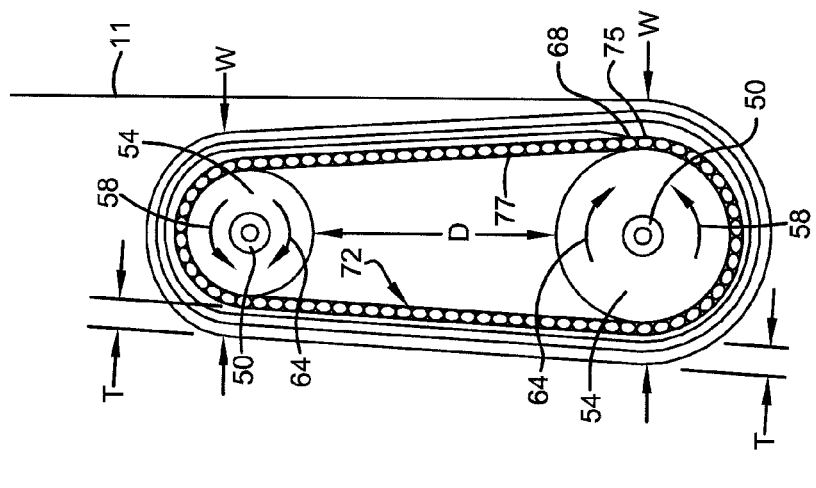
FIG. 8 is a side view of a plurality of spools supporting a track for collecting and storing seatbelt webbing with a seatbelt retractor assembly in accordance with an embodiment of the present invention, wherein the plurality of spools have different diameters.

Embodiments of the present invention that include two or more spools 54 that have different diameters can result in substantially different total diameters W of each spool 54 and the webbing 11 collected there around, as shown in FIG. 8. Thus, the total thickness T of the seatbelt webbing 11 collected at least partially around each spool 54 is approximately the same, regardless of the diameter of each spool 54. For example, the uppermost spool 54 may have four layers of the seatbelt webbing 11 collected at least partially thereabout, while the lowermost spool 54 has about five layers of the seatbelt webbing 11 collected at least partially there around. The minor deviations between the number of layers of seatbelt webbing 11 collected about each spool 54 can be attributed to the location where the terminal end 68 of the seatbelt webbing 11 is secured to the track 72, and the extent of the seatbelt webbing 11 retracted.

But regardless of the number of spools 54 and the total width W of the spools 54 and the seatbelt webbing 11 collected at least partially around said spools 54, the seatbelt webbing 11 is collected and stored in a substantially continuous loop around the plurality of spools 54 as a group. The seatbelt webbing 11 extends substantially around each of the plurality of spools 54 to form the substantially continuous loop about the plurality of spools 54 as a group. This is distinct from passing the seatbelt webbing 11 over a tensioning spool (not shown) or a directional spool (not shown) merely affecting the tension or direction of the seatbelt webbing 11 prior to being collected around a single spool in a retracted state. According to the present invention, the diameter of the plurality of spools 54 about which the seatbelt webbing 11 can be collected in combination with the respective seatbelt webbing 11 collected and at least partially wound there around can be minimized by establishing a suitable distance D between the spools 54. This permits installation of a seatbelt retractor 10 in accordance with the present invention that can retract and collect a greater length of seatbelt webbing 11 within the narrow confines of the internal cavity 32 formed in a sidewall 35 of the motor vehicle. The seatbelt retractor 10 of the present invention can store a greater length of seatbelt webbing 11 within a cavity 32 having limited lateral dimensions than a conventional retractor that collects all of the seatbelt webbing 11 around a single spool.

The length of seatbelt webbing 11 that can be accommodated by a seatbelt retractor 10 according to the present invention can be maximized by establishing a desirable distance D between the spools 54 while minimizing the diameter W of the combination of the spools 54 and the seatbelt webbing 11 collected at least partially there around. Winding the same length of seatbelt webbing 11 about a single spool would establish a total diameter W of the spool and seatbelt webbing 11 wound around that single spool 54 having a significantly larger diameter W than the total diameter of each of the plurality of spools 54 and the webbing 11 collected there around according to the present invention.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A seatbelt retractor for storing seatbelt webbing that can be utilized to restrain an occupant of a motor vehicle comprising:
   a retractor frame;
   a plurality of spools rotatably coupled to the retractor frame and spaced a distance apart from each other, wherein at least a first spool has a substantially different diameter than a second spool, wherein at least a first spool has a substantially different diameter than the other two spools;
   a track that encircles the plurality of spools and rotates about the plurality of spools;
   seatbelt webbing having a terminal end secured to an outwardly-exposed surface of the track, wherein the seatbelt webbing can be withdrawn from the seatbelt retractor to extend about an occupant of a seat of the motor vehicle and releasably coupled to a buckle provided to the motor vehicle in a withdrawn state, and collected by the seatbelt retractor in a retracted state, wherein a length of the seatbelt webbing adjacent to the terminal end thereof is collected at least partially around the plurality of spools in the retracted state;
   a spool biasing assembly for biasing at least one of the plurality of spools in an angular direction, wherein at least one spool rotates when the seatbelt webbing is being retracted from the withdrawn state to the retracted state.

2. The seatbelt retractor according to claim 1, wherein the plurality of spools includes two spools separated by a distance from each other and the seatbelt webbing is wound around the track in the retracted state.

3. The seatbelt retractor according to claim 1, wherein the spool biasing assembly comprises a helical spring for imparting a rotational force on the at least one spool.

4. The seatbelt retractor according to claim 1, wherein the seatbelt retractor is installed within a cavity formed in an aesthetic panel in an interior cabin of the motor vehicle.

5. The seatbelt retractor according to claim 1 further comprising:
   a second retractor frame;
   a second plurality of spools rotatably coupled to the second retractor frame and spaced a distance apart from each other, wherein at least a first spool has a substantially different diameter than a second spool;
   a second track that encircles the second plurality of spools and rotates about the second plurality of spools, wherein a second terminal end of the seatbelt webbing is secured to an outwardly-exposed surface of the second track, and wherein a length of the seatbelt webbing adjacent to the second terminal end thereof is collected at least partially around the second plurality of spools in the retracted state;
   a second spool biasing assembly for biasing at least one of the second plurality of spools in an angular direction, wherein at least one spool rotates when the seatbelt webbing is being retracted from the withdrawn state to the retracted state.

6. A seatbelt retractor for storing seatbelt webbing that can be utilized to restrain an occupant of a motor vehicle comprising:
   a retractor frame;
   a plurality of spools rotatably coupled to the retractor frame and spaced a distance apart from each other, wherein the plurality of spools includes at least three spools;

a track that encircles the plurality of spools and rotates about the plurality of spools;

seatbelt webbing having a terminal end secured to an outwardly-exposed surface of the track, wherein the seatbelt webbing can be withdrawn from the seatbelt retractor to extend about an occupant of a seat of the motor vehicle and releasably coupled to a buckle provided to the motor vehicle in a withdrawn state, and collected by the seatbelt retractor in a retracted state, wherein a length of the seatbelt webbing adjacent to the terminal end thereof is collected at least partially around the plurality of spools in the retracted state;

a spool biasing assembly for biasing at least one of the spools in an angular direction, wherein at least one spool rotates when the seatbelt webbing is being retracted from the withdrawn state to the retracted state.

7. The seatbelt retractor according to claim 6, wherein the spool biasing assembly comprises a helical spring for imparting a rotational force on the at least one spool.

8. The seatbelt retractor according to claim 6, wherein the seatbelt retractor is installed within a cavity formed in an aesthetic panel in an interior cabin of the motor vehicle.

* * * * *